UNITED STATES PATENT OFFICE 2,648,608

STABILIZATION OF FATS AND OILS

Buell W. Beadle, China Lake, Calif., and Henry R. Kraybill, Chicago, Ill., assignors to A. W. Brickman, Victor Conquest, Frank J. Madden, Wrisley B. Oleson, and Emery T. Filbey, Chicago, Ill., trustees for American Meat Institute Foundation, Chicago, Ill., a corporation of Illinois No Drawing. Application October 12, 1951, Serial No. 251,132

11 Claims. (Cl. 99—163)

The present invention relates, generally, to the stabilization of materials normally subject to oxidative rancidity due to their content of glycerides of fatty acids. An important object of the invention is to provide new and useful antioxidant compositions which are highly effective in small concentrations, in the order of a small fraction of a per cent, to impart both long shelf-life and good "carry through" to materials subject to oxidative rancidity, such as animal and vegetable fats and oils, and products made therewith.

A further object is to provide new and useful compositions in a particularly suitable physical form, which serve as media for the practical and convenient incorporation of minute concentrations of oxidation inhibitor compositions into such materials as fats and oils, in the bulk.

A further object of the invention is the provision of a free-flowing material containing a high concentration of a highly potent oxidation inhibitor composition and suitable for addition to fats and oils in the bulk.

Other objects of the invention will, in part, be obvious and will in part appear hereinafter.

This application is a continuation-in-part of our copending application Serial No. 214,440 filed March 7, 1951, and Serial No. 2,557 filed January 15, 1948.

A number of antioxidant compositions have been proposed for stabilizing animal and vegetable fats and oils. Some of these compositions consist of a single substance while others contain a mixture of ingredients. Although some of these previous antioxidant compositions may impart satisfactory shelf-life and others may impart reasonably good "carry-through," we are not aware of any that impart both a high shelf-life and a good "carry-through."

Shelf-life is a measure of the ability of an antioxidant to stabilize animal and vegetable fats and oils and products containing them, when held in storage. Fats frequently need to be stabilized if they are to be stored for considerable periods of time before use. In the investigation and testing of antioxidant compositions, shelf-life is usually determined by accelerated test techniques which usually give indications of actual shelf-life as determined by actual storing at standard normal conditions. There are two types of recognized accelerated tests which are commonly employed. One is the Active Oxygen Method (usually designated by the abbreviation A. O. M.) and the other is the Schaal Oven Test. Both of these testing techniques are described in the literature and are familiar to those skilled in the art.

"Carry-through" is an expression commonly used to designate the measure of the ability of an antioxidant to continue to impart stability to a fatty material after the material has been used in cooking, baking or the like. Thus, an antioxidant may impart a high shelf-life to lard, but when the lard is used in frying or pastry-making the antioxidant may impart little or no stability to the altered lard. Such an antioxidant would be characterized as having poor "carry-through." On the other hand, antioxidants are known which will give only a low shelf-life to a fatty material such as lard, yet these antioxidants may have a relatively high "carry-through" when the lard is altered by cooking or frying.

"Carry-through" may be measured by the Schaal Oven Test, or by actual shelf storage.

In addition to imparting both long shelf-life and high "carry-through," an antioxidant for animal and vegetable fats and oils should meet other requirements, particularly where the fats and oils are edible. These additional requirements may be listed as follows:

1. Should not be toxic in effective stabilizing concentrations.
2. Should not impart color or odor to the material stabilized.
3. Should not effect the taste of the material stabilized.
4. Should be effective in minute concentrations, i. e., in the order of a small fraction of a per cent.
5. Should be soluble in, and remain uniformly distributed throughout, the material stabilized.
6. Should be available in quantity at reasonable cost.
7. Should be available in high purity and uniform quality.

It will be apparent that the foregoing requirements for a food type of antioxidant are much more drastic and numerous than are the requirements for an antioxidant for non-edible materials such as rubber or gasolene.

The object of this invention, generally stated, is the provision of antioxidant compositions for materials normally subject to oxidative rancidity, which besides meeting all of the usual requirements for a food antioxidant, also impart to such materials both long shelf-life and high "carry-through." The antioxidant compositions provided by this invention are particularly useful in stabilizing lard, although they are also effective in stabilizing animal and vegetable fats and oils generally.

Certain other objects of the invention will, in part, be obvious, and will in part appear hereinafter.

For a more complete understanding of the nature and scope of the invention, reference may be had to the following detailed description thereof wherein a preferred example is given by way of illustration.

We have found that materials subject to oxidative rancidity, such as animal and vegetable fats and oils, and products containing these materials, may be effectively stabilized so as to have both long shelf-life and high "carry-through" by the addition thereto of a minor quantity of an antioxidant containing the following combination of ingredients in proper concentrations and proportions:

(a) Butylated hydroquinone monoalkyl ether wherein the alkyl group contains from 1 to 4 carbon atoms inclusive.

(b) Propyl gallate.

(c) An acidic material selected from the group consisting of citric acid, ascorbic acid (vitamin C) oxalic acid, phosphoric acid, ethyl acid phosphate, and triethyl phosphate.

The butylated hydroquinone monoalkyl ether may be a mixture of the isomers as obtained by butylating a hydroquinone monoalkyl ether wherein the alkyl group has from 1 to 4 carbon atoms. We prefer to use the tertiary butyl product.

The following example illustrates a preferred embodiment of the invention.

EXAMPLE I

Fresh lard was stabilized by uniformly distributing therethrough the following antioxidant composition in the concentration indicated:

| | Concentration per cent by weight |
|---|---|
| Tertiary butylated hydroquinone monomethyl ether | 0.01 |
| Propyl gallate | 0.003 |
| Citric acid | 0.002 |

The stability of the unstabilized (control) lard and that of the stabilized (as above) lard were compared by determining, for each, the A. O. M. (Active Oxygen Method) stability of the lards and the Schaal Oven Stability of potato chips, pastry and crackers made with these lards. Results are set forth in Table 1 below:

Table 1

| | Stability AOM, Hours | Potato Chips, Stability, Schaal, Oven, Hours, 145° F. | Pastry Stability, Schaal Oven, Hours, 145° F. | Crackers Stability, Schaal Oven, Hours, 145° F. |
|---|---|---|---|---|
| Untreated (control) Lard | 5¼ | 50 | 34 | 240 |
| Treated Lard | 65 | 940 | 460 | 858 |

EXAMPLE II

A quantity of fresh lard, having an A. O. M. stability of 5 hours, was divided into a number of portions, each of which was treated by adding thereto the kinds and amounts of materials set forth in Table 2 below, and the A. O. M. stability of each of the treated portions determined.

The results including showings of synergism are illustrated in Table 2.

Table 2

| Material Added | Quantity (percent) | AOM Stability (Hours) | Difference from Control (Hours) | Synergism AOM (Hours) |
|---|---|---|---|---|
| None (control) | | 5 | 0 | |
| BHA [1] | 0.01 | 36 | 31 | 0 |
| P. G.[2] | 0.003 | 24 | 19 | 0 |
| C. A.[3] | 0.002 | 5 | 0 | 0 |
| BHA | 0.01 | | | |
| P. G. | 0.003 | 82 | 77 | 27 |
| C. A. | 0.002 | | | |

[1] Tertiary butylated hydroquinone monomethyl ether.
[2] Propyl gallate.
[3] Citric acid.

It is seen from Table 2 that the combination of ingredients comprising the composition of the present invention produces an unexpected synergistic effect which cannot be accounted for on the basis of the individual effects of the components. That is to say, it would be expected that the mixture containing .01% of BHA, .003% of propyl gallate, and .002% of citric acid should result in increasing the stability of a 5 hour lard, based on the individual antioxidant effects of the components by 50 hours. To our surprise, we discovered that the increase in stability, apparently due to the synergism between the components of our antioxidant mixtures was not 50 hours, but 77 hours.

The preferred range of ingredients in our antioxidant composition is from 10 to 20 parts by weight of tertiary butylated hydroquinone monoethyl ether, from 2 to 5 parts by weight of propyl gallate and from 2 to 5 parts by weight of an acid synergist of the class above described. This mixture may be used in amount ranging from about .01 to .03% based on the weight of lard or other glyceridic fatty material to be stabilized.

The butylated hydroquinone monomethyl ether may be replaced with equivalent concentrations of one of the lower alkyl ethers having from 1 to 4 carbon atoms. Thus the ethyl, propyl, isopropyl, or N-butyl ethers may be used.

The citric acid in the examples may be replaced with equivalent concentrations of phosphoric acid, ascorbic acid, ethyl acid phosphate, or triethyl phosphate.

The aforesaid antioxidant compositions may be dissolved in a suitable carrier or solvent such as propylene glycol and the like.

One of the preferred media for carrying relatively high concentrations of the foregoing, and other, oxidation inhibitor compositions, is flaked lard. This is a known material and is made by hydrogenating lard and then flaking the resulting product by flowing it in a thin layer onto a chilled revolving drum from which it is removed in the form of flakes by a doctor blade. In preparing one of the compositions of the present invention, we prefer to incorporate the particular oxidation inhibitor composition being used into the lard after it has been hydrogenated, but before it is flaked. The resulting product has much the same appearance and physical properties of ordinary soap flakes, and is correspondingly free-flowing.

When lard itself is the bulk fat to be stabilized, it is desirable and advantageous to use the flaked lard medium since, while it serves to carry the oxidation inhibitor composition in a high concentration which is several times greater than that required for effective stabilization, it is not considered to be a foreign material.

Products having satisfactory physical properties have been obtained when the concentration of the oxidation inhibitor composition in the lard flakes has been as high as 30%.

Vegetable oil flakes constitute a suitable medium for incorporating high concentrations of oxidation inhibitor compositions. These also constitute a known product and may be made either by further hydrogenating a vegetable shortening, or by directly hydrogenating a vegetable oil to a sufficient extent, and converting the hydrogenated product into flake form in the usual manner. The oxidation inhibitor compositions may be incorporated in the hydrogenated products before flaking in approximately the same concentrations as these compositions are incorporated in lard flakes.

EXAMPLE 3

| | Per cent by weight |
|---|---|
| Lard flakes | 85 |
| Antioxidant A | 15 |
| | 100 |

Antioxidant A had the following composition:

| | Parts by weight |
|---|---|
| Tertiary butylated hydroquinone monomethyl ether | 10 |
| Hydroquinone | 3 |
| Citric acid | 2 |
| | 15 |

When 0.1% of the composition of this example was added to a sample of lard (the control sample of which had a stability of 3 hours by the Active Oxygen Method) the sample remained stable for 55 hours (A. O. M.) before turning rancid. The concentration of the antioxidant A in the lard sample tested was 0.015%.

In a second test 0.1% of the composition of Example 3 was added to another sample of lard the control of which had a stability of 4 hours. The stabilized lard had a stability of 55 hours.

EXAMPLE 4

| | Per cent by weight |
|---|---|
| Lard flakes | 70 |
| Antioxidant A | 30 |
| | 100 |

0.5% of the above composition was added to a sample of lard the control of which had a stability of 3 hours. The stabilized lard had a stability in excess of 165 hours. The concentration of the antioxidant A in this test was 0.15%.

In another test, 0.05% of the composition of this example was added to each of two lard samples the control of which had a stability of ½ hour. The stabilized lard had a stability of 35–42 hours. The concentration of antioxidant A in these two lard samples was .015%.

EXAMPLE 5

| | Per cent by weight |
|---|---|
| Lard flakes | 70 |
| Antioxidant B | 30 |
| | 100 |

Antioxidant B had the following composition:

| | Parts by weight |
|---|---|
| Tertiary butylated hydroquinone monomethyl ether | 20 |
| Propyl gallate | 6 |
| Citric acid | 4 |
| | 30 |

The composition of this example was added in a concentration of 0.05% to lard the control of which had a stability of ½ hour. The stabilized lard had a stability of 31 hours. The concentration of antioxidant B in the lard was 0.015%.

EXAMPLE 6

| | Per cent by weight |
|---|---|
| Lard flakes | 70 |
| Antioxidant C | 30 |
| | 100 |

Antioxidant C had the following composition:

| | Parts by weight |
|---|---|
| Tertiary butylated hydroquinone monomethyl ether | 20 |
| Propyl gallate | 6 |
| Ethyl acid phosphate | 4 |
| | 30 |

The composition of this example was added in a concentration of 0.05% to lard the control of which had a stability of ½ hour. The stabilized lard had a stability of 40 hours. The concentration of antioxidant C in the stabilized lard was 0.015%.

EXAMPLE 7

| | Per cent by weight |
|---|---|
| Lard flakes | 70 |
| Antioxidant A | 30 |
| | 100 |

Antioxidant A had the following composition:

| | Parts by weight |
|---|---|
| Tertiary butylated hydroquinone monomethyl ether | 20 |
| Hydroquinone | 6 |
| Citric acid | 4 |
| | 30 |

The composition of this example was added in a concentration of 0.05% to lard, the control of which had a stability of 8 hours. The stabilized lard had a stability of 66 hours. The concentration of antioxidant A in the stabilized lard was 0.015%.

EXAMPLE 8

| | Per cent by weight |
|---|---|
| Vegetable oil flakes | 70 |
| Antioxidant A | 30 |

Antioxidant A had the following composition:

| | Parts by weight |
|---|---|
| Tertiary butylated hydroquinone | 20 |
| Hydroquinone | 6 |
| Citric acid | 4 |
| | 30 |

The composition of this sample was added in a concentration of 0.05% to lard, the control of which had a stability of 8 hours. The stabilized lard had a stability of 66 hours. The concentration of antioxidant A in the stabilized lard was 0.015%.

The composition of the above examples may be packaged in inexpensive commercial type containers. It may be desirable to package the compositions in small lots of a pound or half pound so the plant operators will not have to weigh out the compositions. Thus, if a ton of lard is to be stabilized with one of the compositions having a 30% antioxidant content, one pound of the flakes will provide an antioxidant concentration in the lard of 0.015%. If the flake composition used had an antioxidant content of 15%, then two pounds of it would be used to provide the 0.015% concentration. The operator has only to open the package of the composition and shake out the flake contents into the lard to which it is to be mixed. The flakes mix easily and uniformly with the hot lard.

What is claimed as new is:

1. A method of stabilizing an animal or vegetable fat or oil which comprises adding thereto a small amount of an antioxidant composition, said composition comprising from 10 to 20 parts by weight of tertiary butylated hydroquinone monoalkyl ether wherein the alkyl group contains from 1 to 4 carbon atoms inclusive, from 2 to 5 parts by weight of propyl gallate and from 2 to 5 parts by weight of an acid material selected from the group consisting of citric acid, ascorbic acid, oxalic acid, phosphoric acid, ethyl acid phosphate and triethyl phosphate.

2. A method of stabilizing an animal or vegetable fat or oil which comprises adding thereto a small amount of an antioxidant composition comprising from 10 to 20 parts by weight of tertiary butylated hydroquinone monomethyl ether, from 2 to 5 parts by weight of propyl gallate and from 2 to 5 parts by weight of an acidic material selected from the group consisting of citric acid, ascorbic acid, oxalic acid, phosphoric acid, ethyl acid phosphate and triethyl phosphate.

3. A method of stabilizing an animal or vegetable fat or oil which comprises adding thereto a small amount of an anitoxidant composition comprising from 10 to 20 parts by weight of tertiary butylated hydroquinone monomethyl ether, from 2 to 5 parts by weight of propyl gallate, and from 2 to 5 parts by weight of citric acid.

4. A method of stabilizing an animal or vegetable fat or oil which comprises adding thereto a small amount of an antioxidant composition dissolved in a carrier therefor, said antioxidant composition comprising from 10 to 20 parts by weight of tertiary butylated hydroquinone monoalkyl ether wherein the alkyl group contains from 1 to 4 carbon atoms inclusive, from 2 to 5 parts by weight of propyl gallate, and from 2 to 5 parts by weight of an acid synergist.

5. Lard stabilized by the presence of each of the following, (a) from .01 to .02% by weight based on the glyceride content of tertiary butylated hydroquinone monoalkyl ether wherein the alkyl group contains from 1 to 4 carbon atoms inclusive, (b) from .002 to .005% by weight of propyl gallate, (c) from .002 to .005% by weight of an acidic material selected from the group consisting of citric acid, ascorbic acid, oxalic acid, phosphoric acid, ethyl acid phosphate and triethyl phosphate.

6. A fatty acid glyceride stabilized by the presence of each of the following, (a) from .01 to .02 per cent by weight of tertiary butylated hydroquinone monomethyl ether, (b) from .002 to .005 per cent by weight of propyl gallate, (c) from .002 to .005% by weight of citric acid.

7. As a new composition of matter, lard flakes in free-flowing condition containing 15–30 per cent by weight of an antioxidant composed of (a) 10–20 parts by weight of tertiary butylated hydroquinone monomethyl ether, (b) 2–5 parts by weight of hydroquinone, (c) 2–5 parts by weight of an acidic material selected from the group consisting of citric acid, ascorbic acid, oxalic acid, phosphoric acid, ethyl acid phosphate, and triethyl phosphate.

8. A new composition of matter, lard flakes in free-flowing condition containing from 15–30 per cent by weight of an antioxidant composed of approximately 10 parts by weight of tertiary butylated hydroquinone monomethyl ether, approximately 3 parts by weight of hydroquinone and approximately 2 parts by weight of citric acid.

9. As a new composition of matter, lard flakes in free-flowing condition containing from 15–30 per cent by weight of an antioxidant composed of approximately 10 parts by weight of tertiary butylated hydroquinone monomethyl ether, approximately 3 parts by weight of propyl gallate and approximately 2 parts by weight of citric acid.

10. As a new composition of matter, lard flakes in free-flowing condition containing from 15–30 per cent by weight of an antioxidant composed of approximately 10 parts by weight of tertiary butylated hydroquinone monomethyl ether, approximately 3 parts by weight of propyl gallate, and approximately 2 parts by weight of ethyl acid phosphate.

11. As a new composition of matter, lard flakes in free-flowing condition containing from 15–30 per cent by weight of an antioxidant composed of 10 to 20 parts by weight of tertiary butylated hydroquinone monomethyl ether, 2 to 5 parts by weight of a material selected from the group consisting of hydroquinone and propyl gallate, and approximately 2 to 5 parts by weight of an acid synergist.

BUELL W. BEADLE.
HENRY R. KRAYBILL.

No references cited.